UNITED STATES PATENT OFFICE.

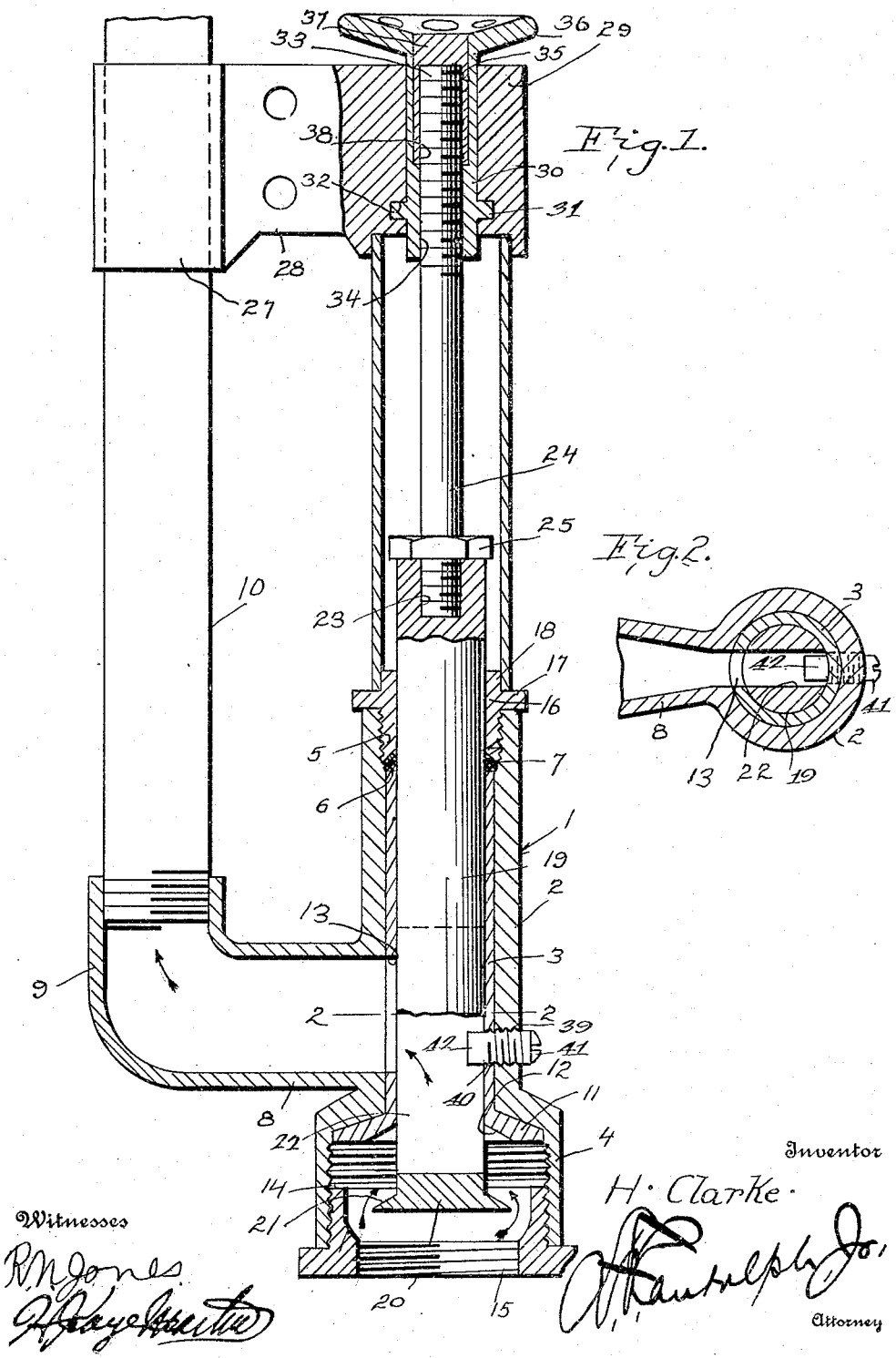

HENRY CLARKE, OF LE MARS, IOWA.

VALVE.

1,200,313.  Specification of Letters Patent.  Patented Oct. 3, 1916.

Application filed September 19, 1914. Serial No. 862,570.

*To all whom it may concern:*

Be it known that I, HENRY CLARKE, a citizen of the United States, residing at Le Mars, in the county of Plymouth and State of Iowa, have invented certain new and useful Improvements in Valves, of which the following is a specification.

This invention relates to new and useful improvement in valves, and has for its principal object to provide a novel valve which may be easily and quickly opened or closed at the desire of the user.

Another object of the invention is to provide a valve having a non-corrodible lining which will remove any danger of infection of the liquid passing through the valve.

A further object of the invention is to provide a novel means for holding the lining and valve in proper position and preventing the same from becoming separated.

A still further object of the invention is to provide a valve having a removable lining so that the same may be easily and quickly removed should it become worn or otherwise unfit for use.

With these and other objects in view, the invention consists in the novel combination and arrangement of parts which will be fully set forth in the following specification and accompanying drawings, in which, Figure 1 is a longitudinal sectional view of a valve constructed in accordance with this invention, and Fig. 2 is a transverse sectional view taken on line 2—2 of Fig. 1.

Referring now to the drawings by characters of reference, the numeral 1 designates as an entirety a valve constructed in accordance with this invention which comprises the outer casing 2 and inner casing 3. This outer casing is preferably cylindrical in cross section and provided at one end with the enlarged internally screw threaded portion 4, the use of which will appear as the description proceeds. The opposite end of the member 2 is internally screw threaded as at 5 and constructed so as to form the shoulder 6 against which the packing material 7 is seated. Near the enlarged end 4 of the cylindrical casing 2 is provided the angularly extending tubular portion 8 which terminates in the elbow 9, the free end of which is connected to the outlet pipe 10 as will be clearly seen upon referring to Fig. 1.

The lining 3 is provided at one end with the enlargement 11 which is arranged to seat against the shoulder formed by the enlarged portion 4, and is tapered as at 12, the use of which will appear as the description proceeds. A suitable aperture 13 is formed laterally of the lining 3 and is arranged to register with the inner end of the tubular member 8 to form a passage through which the liquid passes.

A suitable bushing 14 is provided with external screw threads which are arranged to coöperate with the internally threaded portion 4. A plurality of internal screw threads 15 are formed interiorly of the bushing and are arranged to form a means whereby the device may be connected to a water main or other source of liquid supply. A bushing 16 is threaded into the opposite end of the cylindrical casing 2 and is arranged to engage the packing 7 and prevent any leakage. This bushing 16 is provided with a suitable flange 17 which abuts the end of the casing 1 and forms a support for the valve operating mechanism as will appear hereinafter. A suitable extension 18 is formed on the bushing 16 and coöperates with the flange 17 in holding the several elements in place.

Slidable longitudinally through the lining is the plunger 19, having the enlargement or valve 20 formed at one end. This enlargement is provided with the beveled face 21 to engage the tapered valve seat 12. A suitable slot 22 is formed longitudinally in the plunger near the lower end and is arranged to permit the liquid which enters the chamber formed by the enlargement 4, to pass into the tubular portion 8 as indicated by the arrows in Fig. 1. An internally screw threaded aperture 39 is formed in the casing 2, a similar aperture 40 is formed in the lining 3, and a set screw 41 having one end square as at 42 is threaded into the said apertures and the squared end extends into the longitudinal slot 22, to prevent the plunger 19 from rotating. The upper end of the plunger 19 is provided with the internally screw threaded recess 23, which is arranged to receive the threaded end of the stem 24, which is held firmly in place by the lock nut 25.

Secured to the outlet pipe 10 is a suitable clamp 27, which is provided with the angular extension 28 terminating in the enlarged portion 29. A cylindrical member 30 extends through the portion 29 and is provided near its lower end with the flange 31, which is arranged to turn in the groove 32 formed in the portion 29. The upper end of the stem 24 is externally screw threaded as at 33, and extends into the threaded aperture 34 formed in the cylindrical member 30. This cylindrical member is also provided with a smooth enlarged bore 35, and has the hand wheel 36 formed at its upper end. A suitable cap 37, having the internal screw threads 38, is threaded on the upper end 33 of the stem 24, and is slidable in the bore 35 in the cylindrical member 30. The lower end of the cap 37 is arranged to act as a stop to abut against the shoulder formed by the smooth enlarged bore 35 for limiting the downward movement of the plunger.

It will be apparent from the foregoing that in use when the hand wheel 36 is turned in such a direction as to cause the cylindrical member 30 to rotate in the enlarged member 29, the stem 24 will slide vertically and thus force the plunger 19 downwardly as the set screw 42 prevents rotation thereof, thus removing the portion 20 from the valve seat 12 and permitting the liquid to pass through the chamber formed by the enlargement 4, through the slots 22 and into the pipe 10, as indicated by the arrows. When it is desired to close the valve, the hand wheel 36 is turned in the reverse direction, which will cause the stem 24 to slide vertically and force the plunger 19 upwardly and cause the beveled face 21 of the valve 20 to engage the valve seat 12, and thus close the passage through the valve.

While in the foregoing there has been shown and described the preferred embodiment of this invention, it is to be understood that such changes may be made in the combination and arrangement of parts as will fall within the spirit and scope of the invention as defined in the appended claims.

Having thus described my invention, I claim:

1. A valve including a casing, a lining removably secured within the casing, said lining and casing being provided with alining apertures, an outlet pipe connected to the casing in alinement with the apertures, a plunger slidable through the lining, said plunger being provided with a longitudinal slot near the lower end, means carried by said casing and lining for holding said slot in alinement with the outlet opening, and preventing said plunger from rotation, a valve seat formed on the lining, a valve carried by one end of the plunger for engaging the valve seat, a stem secured to the upper end of said plunger, and a hand wheel for said stem to control the operation of the plunger through the lining.

2. A valve including a casing, a lining in the casing, an enlargement at one end of the casing, said enlargement being internally screw threaded, an enlargement at one end of the lining, said enlargement engaging the enlargement on the casing, removable means carried by the casing to hold the lining in place, a plunger slidable through the lining, said plunger being provided with a longitudinal slot near one end, an enlargement on one end of the plunger, a valve seat on said lining and adapted to coöperate with the enlargement on the plunger, a stem secured to the opposite end of the plunger, a hand wheel for said stem whereby the operation of the valve may be controlled, and means carried by the upper end of said stem to limit the downward movement of said plunger.

3. A valve including a casing, a lining removably secured within the casing, said lining and casing being provided with alining apertures, an outlet pipe connected to the casing in alinement with the apertures, a plunger slidable through the lining, said plunger being provided with a longitudinal slot near the lower end, means carried by the casing and lining for holding said slot in alinement with the outlet opening and preventing said plunger from rotation, a valve seat formed on the lining, a valve carried by one end of the plunger for engaging the valve seat, a stem secured to the upper end of said plunger, and having the upper end screw threaded, a clamp secured to said outlet pipe and provided with an enlarged portion, a cylindrical member rotatably mounted in said enlarged portion, and provided with a screw threaded aperture to receive the upper end of said stem, said cylindrical member also provided with an enlarged smooth bore forming a shoulder within said member, a cap fitted for engagement with said shoulder on said stem to limit the downward movement of said plunger and a hand wheel mounted on said cylindrical member to control the operation of the valve.

4. A valve including a casing, a lining removably secured within the casing, said lining and casing being provided with alining apertures, an outlet pipe connected to the casing in alinement with the apertures, a plunger slidable through the lining, said plunger being provided with a longitudinal slot near the lower end, means carried by the casing and lining for holding said slot in alinement with the outlet opening, and preventing said plunger from rotation, a valve seat formed on the lining, a valve carried by one end of the plunger for engaging the valve seat, a stem secured to the upper end of said plunger and having the upper end screw threaded, a clamp secured to said outlet pipe provided with an enlarged portion, said enlarged portion provided with an opening therethrough and a groove surrounding said opening, a cylindrical member in said opening being provided near its lower end with a flange arranged to turn in said groove thereby permitting the rotation of said cylindrical member in said enlarged portion, said cylindrical member being provided with a screw threaded aperture to receive the upper end of said stem, said cylindrical member being also provided with an enlarged smooth bore forming a shoulder within said member, a cap fitted on said stem the lower end of said cap serving as a stop to abut against the said shoulder to limit the downward movement of said plunger, and a hand wheel mounted on said cylindrical member to control the operation of the plunger.

In testimony whereof I affix my signature in presence of two witnesses.

HENRY CLARKE.

Witnesses:
EVERETT SIMONS,
ADAM R. CLARKE.

Copies of this patent may be obtained for five cents each, by addressing the "Commissioner of Patents, Washington, D. C."